(12) United States Patent
Tsai

(10) Patent No.: US 7,097,146 B2
(45) Date of Patent: Aug. 29, 2006

(54) ANTI-VIBRATION PLATFORM FOR SEMICONDUCTOR EQUIPMENT

(76) Inventor: Hong-I Tsai, 2F, No. 251, Sec. 3, Bade Rd., Songshan District, Taipei City (TW) 105

( * ) Notice: Subject to any disclaimer, the term of this patent is extended or adjusted under 35 U.S.C. 154(b) by 212 days.

(21) Appl. No.: 10/791,882

(22) Filed: Mar. 4, 2004

(65) Prior Publication Data

US 2005/0040312 A1 Feb. 24, 2005

(30) Foreign Application Priority Data

Aug. 21, 2003 (TW) ............................... 92215211 U

(51) Int. Cl.
*F16M 1/00* (2006.01)

(52) U.S. Cl. ...................... 248/679; 248/678; 248/638; 403/169; 403/170

(58) Field of Classification Search ............ 403/169 X, 403/170 X, 171, 176, 217; 52/637, 649.1, 52/648.1, 65.2, 651.06, 655.1, 656.9; 248/603, 248/610, 618, 638, 644, 661, 663, 678, 679, 248/676, 179.1, 180.1, 163.1; 108/4, 147
See application file for complete search history.

(56) References Cited

U.S. PATENT DOCUMENTS

| | | | | |
|---|---|---|---|---|
| 3,995,962 A | * | 12/1976 | Mylaeus | 403/47 |
| 4,161,088 A | * | 7/1979 | Gugliotta et al. | 52/223.12 |
| 4,313,687 A | * | 2/1982 | Apeztegui et al. | 403/171 |
| 4,822,199 A | * | 4/1989 | Nehls | 403/171 |
| 4,863,303 A | * | 9/1989 | Croucher et al. | 403/11 |
| 4,872,779 A | * | 10/1989 | Imai | 403/171 |
| 5,901,936 A | * | 5/1999 | Bieg | 248/370 |

* cited by examiner

*Primary Examiner*—Gwendolyn Baxter
(74) *Attorney, Agent, or Firm*—Rosenberg, Klein & Lee

(57) ABSTRACT

An anti-vibration platform for supporting a semiconductor equipment is constructed from a plurality of top and bottom ball couplings having threaded holes provided thereon, a plurality of rigid connecting bars separately horizontally or diagonally connected at two externally threaded free ends to two of the ball couplings, and a plurality of vertical supports separately connected at two externally threaded free ends to two vertically corresponding ball couplings. Steel plates are provided at a bottom and four sides of the platform, and threaded bars are provided to extend through the side steel plates to connect the platform to a concrete foundation. Anti-vibration and pressure-resistant elastomeric material is applied to the bottom of the platform to wrap joints of the bottom ball couplings, the connecting bars, and the vertical supports. A flat bed is positioned to a top of the platform by screwing to the top ball couplings.

3 Claims, 6 Drawing Sheets

ANTI-VIBRATION PLATFORM FOR SEMICONDUCTOR EQUIPMENT

BACKGROUND OF THE INVENTION

1. Field of the Invention

The present invention relates to an anti-vibration platform, and more particularly to an anti-vibration platform for semiconductor equipment that is constructed by assembling a plurality of ball couplings, connecting bars, and vertical supports to one another, and provided with special anti-vibration measures to be safer and more convenient and durable for use.

2. Description of the Prior Art

Most of the conventional platforms for supporting semiconductor equipment are constructed by welding steel frames together and then provided the welded steel frames with flexible vibration-isolating structures. For example, the vibration-isolating structure disclosed in Taiwan Publication No. 530862 includes horizontal upper and lower base plates, and a column vertically connected to and located between the upper and the lower plates via upper and lower annular cushions. The vertical column is provided around its outer surface with shrouding means based on the Poisson's Ratio in the elasticity, so that the structure so formed naturally has a large vertical rigidity for supporting the structure weight, and a large horizontal softness for isolating the structure from earthquake energy. The vibration-isolating structure is characterized in that the vertical column is formed with a plurality of V-shaped grooves. An annular shrouding means is arranged at the tip of each of the V-shaped groove, and preload is applied to the shrouding means. An energy dissipator is provided in the vertical column to form an integrated body. The upper and lower plates are formed with holes for fastening respectively to the pillar and ground of a building. The vertical column, and upper and lower plates can be of circular, rectangular, oval or rhombus shape. The upper and lower plates are connected to the vertical column by means of a mooring device.

The conventional high-rigidity structures developed in the early stage did not thoroughly consider the problem of vibration isolation. Having been affected by the disasters caused by earthquakes, the construction and architecture fields have changed their design concepts. However, the current construction design involving vibration isolation, vibration protection or vibration absorption only relates on elastic members attached to the basis of the main structure. When the platform or the whole structure is subject to vibration, the vibration-isolating means thereof are vibrated at the same time and therefore provide only very limited protection to the main structure. It is therefore desirable to develop an anti-vibration structure that is vibration-resistant to effectively protect the main structure from damage caused by the vibration.

SUMMARY OF THE INVENTION

A primary object of the present invention is to provide an anti-vibration platform for semiconductor equipment, which is constructed by connecting various components in a convenient, safe, durable, and vibration-resistant manner.

According to the present invention, the components for the anti-vibration platform include a ball coupling having a spherical body with a truncated top, on which at least one threaded hole is provided. The spherical body of the ball coupling is also provided on the spherical surface with a plurality of threaded holes for connecting to threaded ends of rigid connecting bars and vertical supports.

Since the anti-vibration platform of the present invention is constructed by assembling various components together, it can be more conveniently and quickly transported and erected for use without the need of big-scaled machinery. And, since the components for the platform of the present invention may be freely assembled, the platform may be welded at a safe site and then transported to the construction site for erection to maintain the required quality and safety of the platform.

Moreover, the platform of the present invention may be freely extended in two dimensions and locally repaired to reduce the construction cost thereof.

To prevent the components of the platform, particularly those at the bottom of the platform, from loosening or separating from one another, anti-vibration and pressure-resistant elastomeric material may be applied to the bottom of the platform to wrap joints of the ball couplings, the connecting bars, and the vertical supports, and any other welded joint on these components, making the bottom of the platform safer and more secure for use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
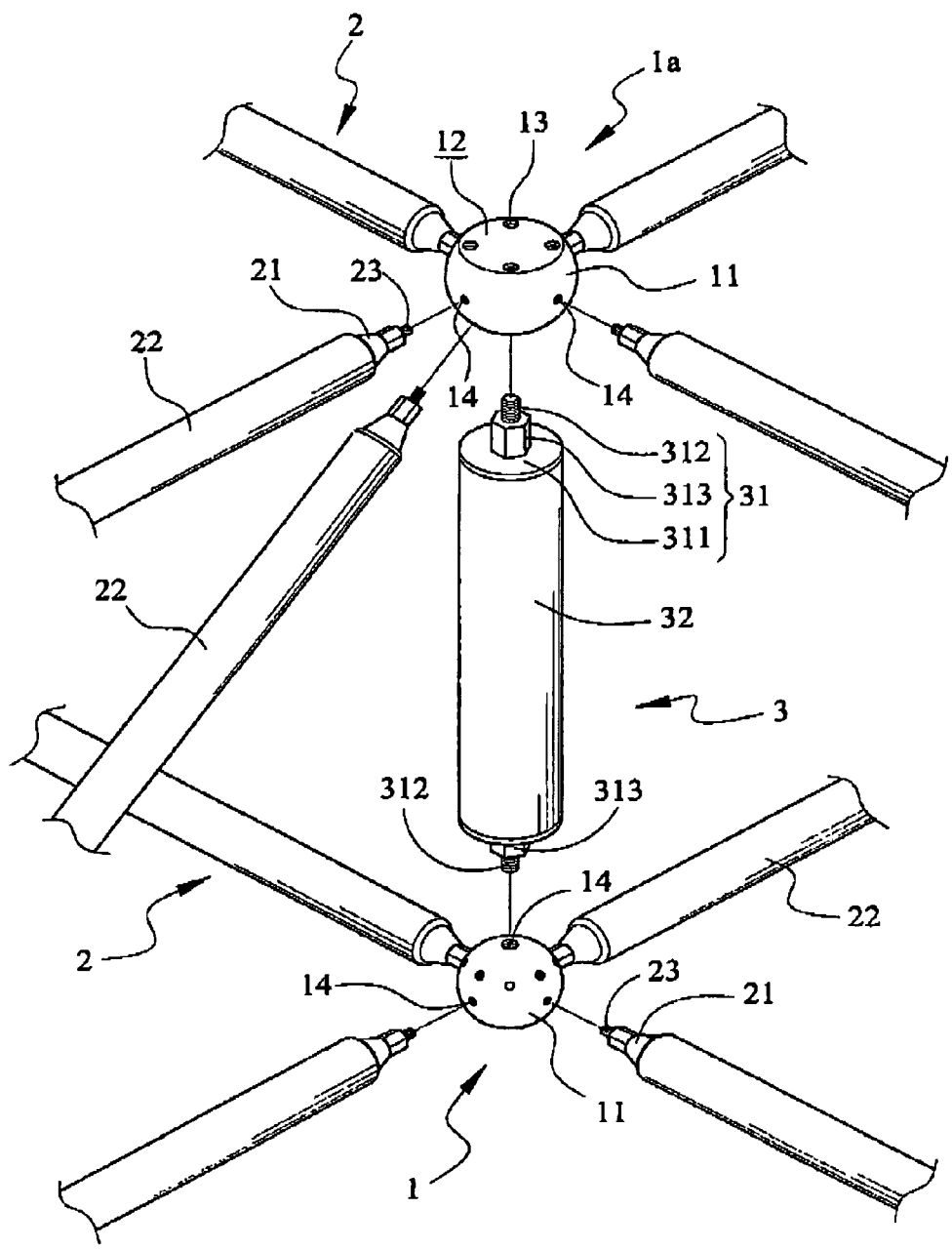
FIG. 1 is a fragmentary, exploded perspective view of an anti-vibration platform for semiconductor equipment according to the present invention.
Figure 2:
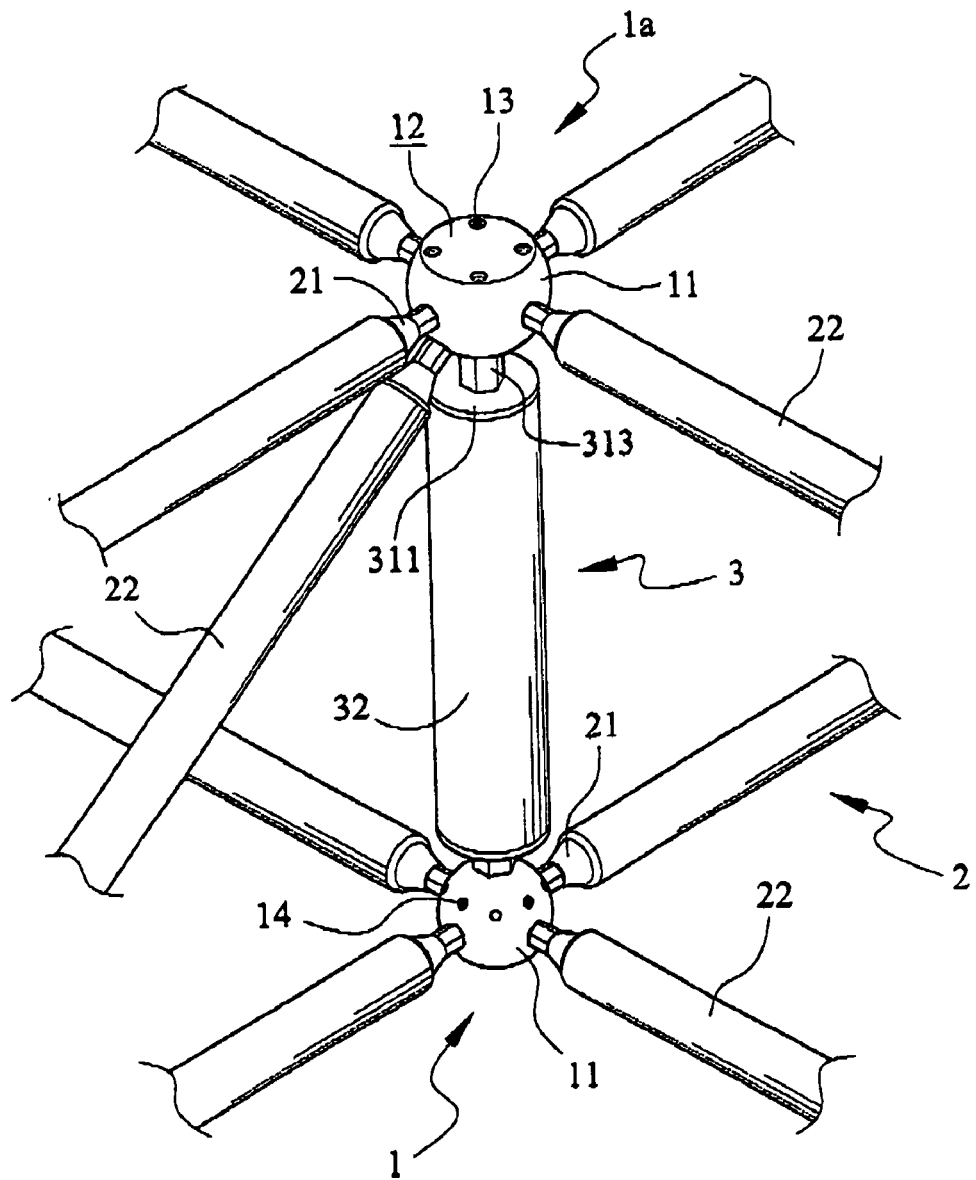
FIG. 2 is an assembled view of FIG. 1.

Please refer to FIGS. 1 and 2 that are fragmentary exploded and assembled perspective views, respectively, of an anti-vibration platform for supporting a semiconductor equipment thereon in accordance with a preferred embodiment of the present invention. As shown, the anti-vibration platform for semiconductor equipment according to the present invention is constructed from a plurality of ball couplings 1 and 1a, a plurality of rigid connecting bars 2, and a plurality of vertical supports 3.

Each of the ball couplings 1, 1a includes a spherical body 11 having a plurality of internally threaded holes 14 provided at predetermined points on a spherical outer surface thereof.

The ball coupling 1a is for use at a top of the constructed anti-vibration platform and has a spherical body 11 with a truncated top 12, on which at least one internally threaded hole 13 is provided.

Each of the rigid connecting bars 2 includes a barred body 22 having a predetermined length, and an adapting head 21 firmly fitted to each end of the barred body 22 by way of full-circled welding at a joint of the adapting head 21 and the end of the barred body 22. The adapting head 21 is provided at a front end with an externally threaded rod 23 for screwing into the internally threaded hole 14 on the spherical body 11 of the ball coupling 1, 1a.

Each of the vertical supports 3 includes a steel pipe 32, and an adapting cap 31 fitted to each end of the steel pipe 32. The adapting cap 31 includes an end cap 311, an extended section 313 projected from an outer side of the end cap 311, and an externally threaded rod 312 projected from an outer end of the extended section 313. The externally threaded rod 312 may be screwed into the internally threaded hole 14 on the ball coupling 1, 1a for the vertical support 3 to stably connected at two ends to a top ball coupling 1a and a bottom ball coupling 1.

Figure 3:
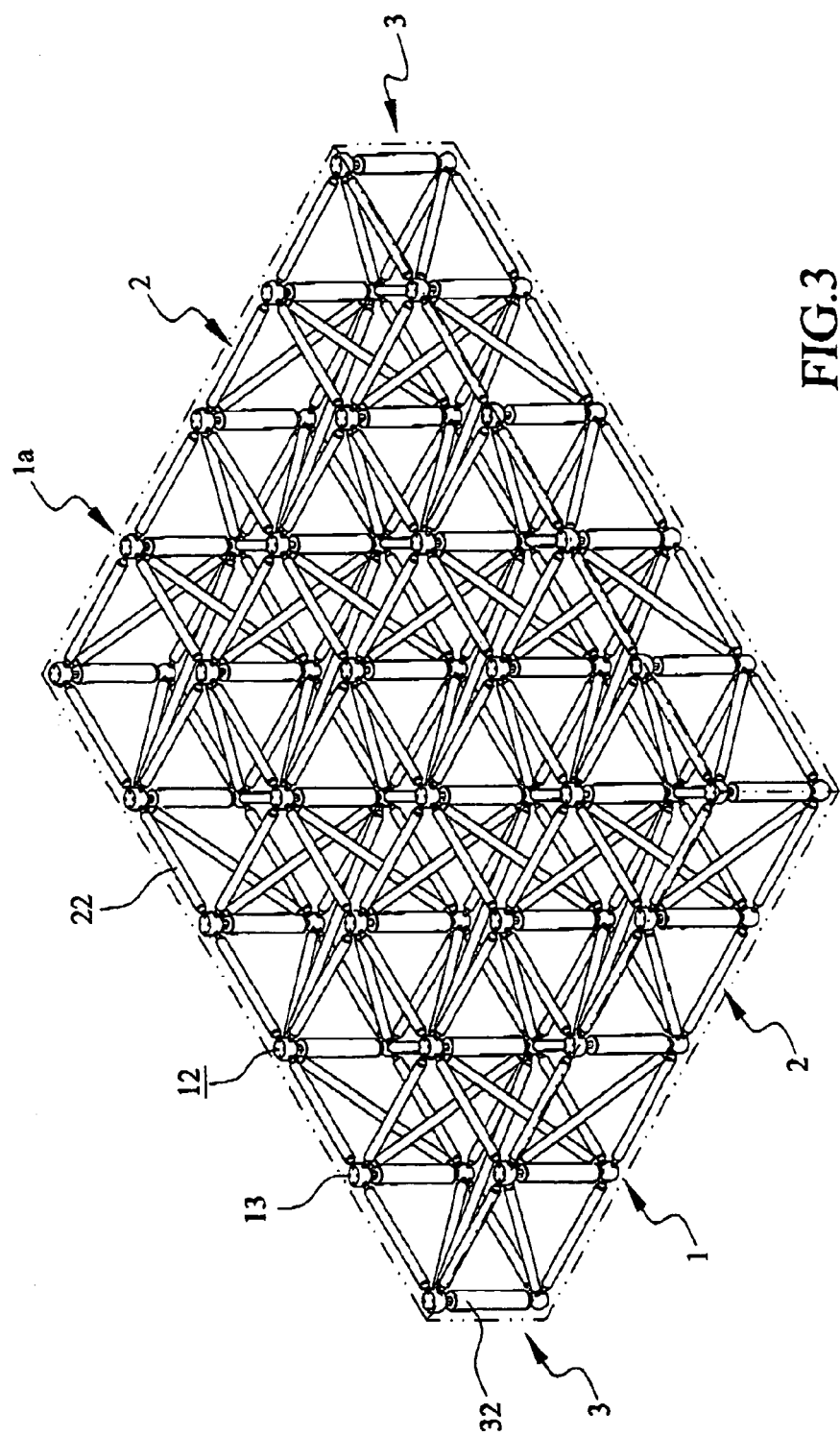
FIG. 3 shows an example of the platform of the present invention constructed by connecting a plurality of rigid connecting bars and vertical supports to a plurality of ball couplings.

By way of assembling the above-described components to one another, an anti-vibration platform for semiconductor equipment or other applications may be formed to substitute for conventional platforms. FIG. 3 shows an example of the anti-vibration platform of the present invention constructed by connecting a plurality of the rigid connecting bars 2 and the vertical supports 3 to a plurality of the ball couplings 1, 1a. It is understood the anti-vibration platform so constructed has an area that can be properly adjusted depending on different factors, such as the environment in which the platform is to be used, the function to be provided by the platform, and other actual needs.

Figure 4:
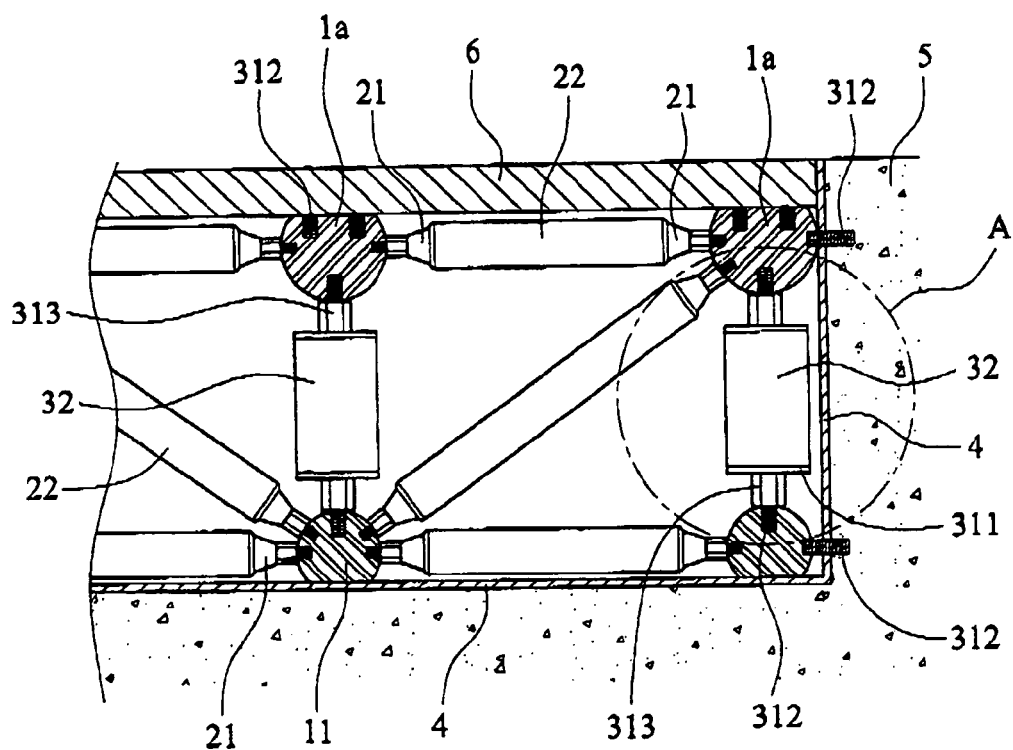
FIG. 4 is a fragmentary, assembled sectional view of the present invention showing the connection of the rigid connecting bars and the vertical supports to the ball couplings.
Figure 5:
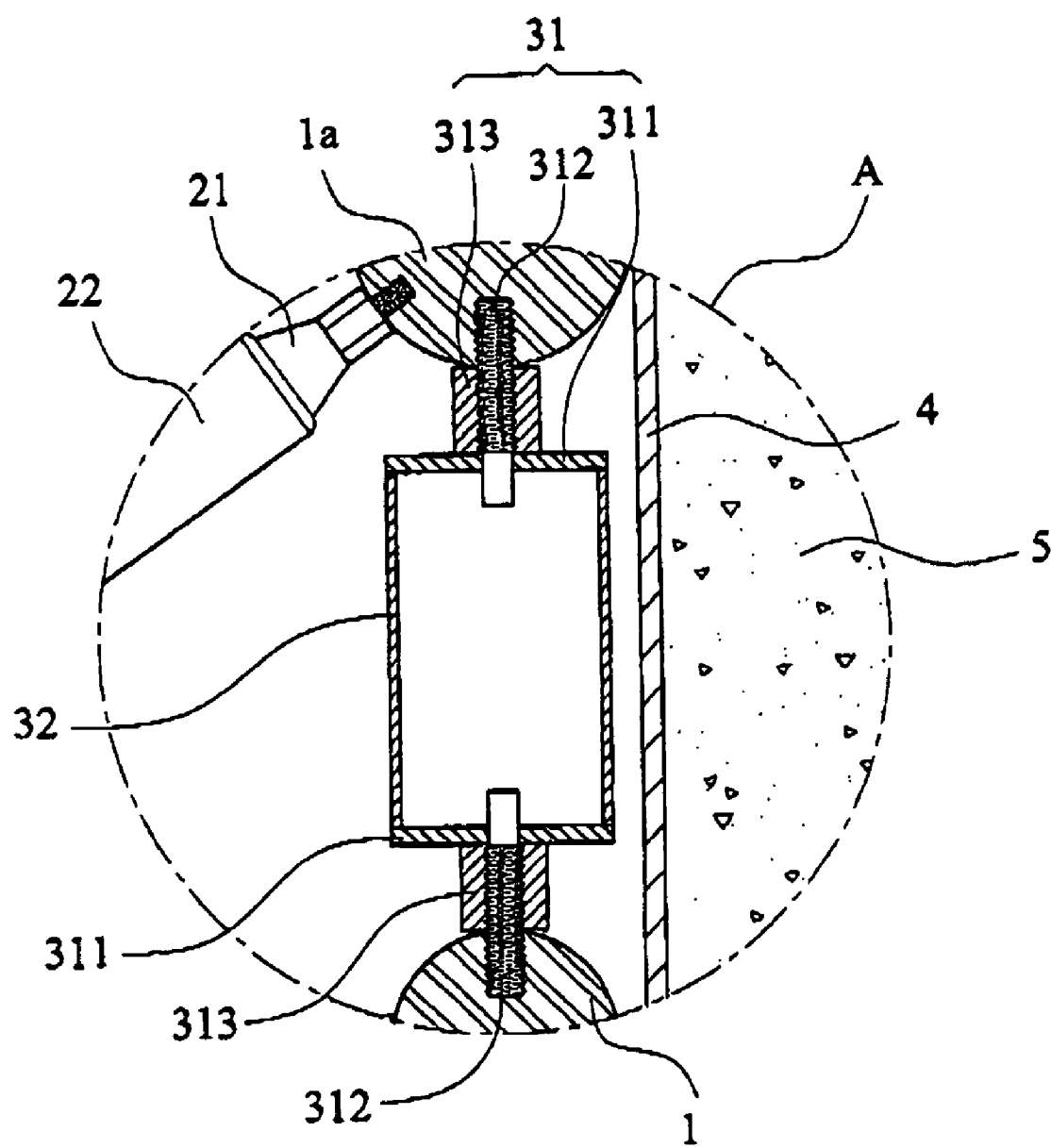
FIG. 5 is an enlarged view of the circled area A in FIG. 4.

Please refer to FIG. 4 that is a fragmentary, assembled sectional view of the anti-vibration platform according to the present invention showing the connection of the rigid connecting bars 2 and the vertical supports 3 to the ball couplings 1, 1a, and to FIG. 5 that is an enlarged view of the circled area A of FIG. 4. In practical implementation of the present invention, the anti-vibration platform for semiconductor equipment is covered at a bottom and all four sides with steel plates 4. Moreover, threaded rods 312 are provided to extend through the steel plates 4 at each side of the platform that is adjacent to a concrete foundation 5, so that the spherical bodies 11 of the ball couplings 1, 1a adjacent to the concrete foundation 5 are firmly screwed to the concrete foundation 5 via the threaded rods 312. Alternatively, the threaded rods 312 may be replaced with conventional anchor bolts.

A flat bed 6 is positioned on the top of the anti-vibration platform for semiconductor equipment. The flat bed 6 is provided at predetermined positions with a plurality of externally threaded rods 312. By screwing the threaded rods 312 on the flat bed 6 into the internally threaded holes 13 on the top ball couplings 1a, the flat bed 6 is firmly supported on the truncated tops 12 of the ball couplings 1a.

The vertical support 3 is vertically screwed at two ends to the ball coupling 1 and the ball coupling 1a, and the rigid connecting bars 2 are either horizontally connected at two ends to two ball couplings 1 or 1a, or diagonally connected at two ends to two ball couplings 1 and 1a. When the flat bed 6 is subject to an external force and vibrated, the platform below the flat bed 6 is useful in protecting the flat bed 6 against vibration.

Figure 6:
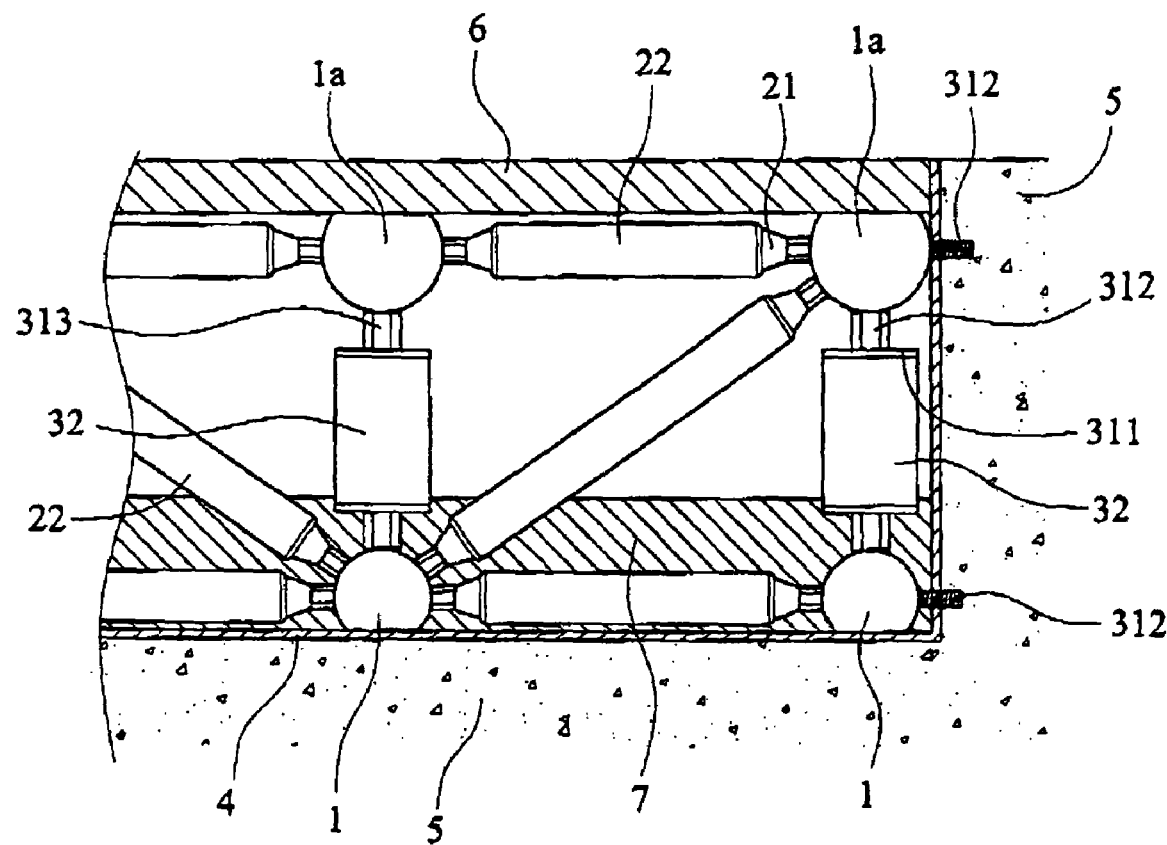
FIG. 6 is a fragmentary, assembled side view of the anti-vibration platform according to another embodiment of the present invention.

FIG. 6 is a fragmentary, assembled side view of the anti-vibration platform according to another embodiment of the present invention. In this embodiment, an anti-vibration and pressure-resistant elastomeric material 7, such as an epoxy resin material, is applied at positions at where the ball couplings 1, the rigid connecting bars 2, and the vertical supports 3 are connected to one another, so that these components are connected without the risk of loosening and separating from one another.

The present invention has been described with some preferred embodiments thereof and it is understood that many changes and modifications in the described embodiments can be carried out without departing from the scope and the spirit of the invention that is to be limited only by the appended claims.

What is claimed is:

1. An anti-vibration platform for supporting a semiconductor equipment thereon, comprising:

a plurality of top ball couplings, each of which having a truncated top, each said top coupling being provided at a spherical surface with a plurality of internally threaded holes, and at said truncated top with at least one internally threaded hole;

a plurality of bottom ball couplings, each of which being provided at a spherical surface with a plurality of internally threaded holes;

a plurality of rigid connecting bars, each of which including a barred body having two externally threaded rods provided at two free ends thereof;

said rigid connecting bar being adapted to connect at said two free ends to two said bottom ball couplings, two said top ball couplings, or one said bottom and one said top ball coupling by screwing said externally threaded rods into said internally threaded holes on the spherical surfaces of said ball couplings; and a plurality of vertical supports, each of which including a steel pipe and two externally threaded rods provided at two free ends of said steel pipe; and said vertical support being adapted to extend between two vertically corresponding top and bottom ball couplings by screwing said externally threaded rods into said internally threaded holes provided on the spherical surfaces of said ball couplings;

said platform being covered at a bottom and all four sides thereof with steel plates, and the sides of said platform adjacent to a concrete foundation of said platform being provided with externally threaded rods that are extended from said top and said bottom ball couplings adjacent to the concrete foundation through said steel plates into said concrete foundation.

2. An anti-vibration platform for supporting a semiconductor equipment thereon, comprising:

a plurality of top ball couplings, each of which having a truncated top, each said top coupling being provided at a spherical surface with a plurality of internally threaded holes, and at said truncated top with at least one internally threaded hole;

a plurality of bottom ball couplings, each of which being provided at a spherical surface with a plurality of internally threaded holes;

a plurality of rigid connecting bars, each of which including a barred body having two externally threaded rods provided at two free ends thereof;

said rigid connecting bar being adapted to connect at said two free ends to two said bottom ball couplings, two said top ball couplings, or one said bottom and one said top ball coupling by screwing said externally threaded rods into said internally threaded holes on the spherical surfaces of said ball couplings;

a plurality of vertical supports, each of which including a steel pipe and two externally threaded rods provided at two free ends of said steel pipe; and said vertical support being adapted to extend between two vertically corresponding top and bottom ball couplings by screwing said externally threaded rods into said internally threaded holes provided on the spherical surfaces of said ball couplings; and a flat bed positioned on a top of said platform, said flat bed being provided at predetermined positions with a plurality of externally threaded rods for screwing into said at least one internally threaded hole on each of said truncated tops of said top ball couplings.

3. An anti-vibration platform for supporting a semiconductor equipment thereon, comprising:

a plurality of top ball couplings, each of which having a truncated top, each said top coupling being provided at a spherical surface with a plurality of internally threaded holes, and at said truncated top with at least one internally threaded hole;

a plurality of bottom ball couplings, each of which being provided at a spherical surface with a plurality of internally threaded holes;

a plurality of rigid connecting bars, each of which including a barred body having two externally threaded rods provided at two free ends thereof;

said rigid connecting bar being adapted to connect at said two free ends to two said bottom ball couplings, two said top ball couplings, or one said bottom and one said top ball coupling by screwing said externally threaded rods into said internally threaded holes on the spherical surfaces of said ball couplings;

a plurality of vertical supports, each of which including a steelpipe and two externally threaded rods provided at two free ends of said steel pipe; and said vertical support being adapted to extend between two vertically corresponding top and bottom ball couplings by screwing said externally threaded rods into said internally threaded holes provided on the spherical surfaces of said ball couplings; and an anti-vibration and pressure-resistant elastomeric material applied on the bottom of said platform to wrap all screwed and/or welded joints of said bottom ball couplings, said rigid connecting bars, and said vertical supports.

* * * * *